(12) United States Patent
Loce et al.

(10) Patent No.: US 8,049,929 B2
(45) Date of Patent: Nov. 1, 2011

(54) COLOR MANAGEMENT OF HALFTONED IMAGES

(75) Inventors: Robert Paul Loce, Webster, NY (US); Beilei Xu, Penfield, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1792 days.

(21) Appl. No.: 11/218,966

(22) Filed: Sep. 2, 2005

(65) Prior Publication Data
US 2007/0053003 A1   Mar. 8, 2007

(51) Int. Cl.
H04N 1/405 (2006.01)
H04N 1/40 (2006.01)

(52) U.S. Cl. ............ 358/3.06; 358/3.03; 358/3.07; 358/3.08; 358/3.09; 358/3.12; 358/3.21; 358/3.24

(58) Field of Classification Search .......... 358/1.9, 358/3.06, 3.03, 3.12; 382/262
See application file for complete search history.

(56) References Cited

U.S. PATENT DOCUMENTS

| | | | | |
|---|---|---|---|---|
| 5,649,073 A * | 7/1997 | Knox et al. | | 358/1.9 |
| 5,991,512 A * | 11/1999 | Shaked et al. | | 358/1.9 |
| 6,320,676 B1 * | 11/2001 | Yoshidome | | 358/1.9 |
| 6,539,125 B1 * | 3/2003 | Harrington | | 382/262 |
| 6,704,123 B1 * | 3/2004 | Av-Shalom et al. | | 358/2.99 |
| 2003/0090729 A1 * | 5/2003 | Loce et al. | | 358/3.06 |
| 2003/0218780 A1 * | 11/2003 | Braun et al. | | 358/3.12 |
| 2004/0032600 A1 | 2/2004 | Burns et al. | | |
| 2004/0257619 A1 | 12/2004 | Loce et al. | | |
| 2005/0036163 A1 * | 2/2005 | Edge | | 358/1.9 |
| 2005/0083555 A1 * | 4/2005 | Chien et al. | | 358/3.06 |
| 2005/0104974 A1 * | 5/2005 | Watanabe et al. | | 348/222.1 |
| 2005/0219622 A1 * | 10/2005 | Chen et al. | | 358/3.06 |
| 2005/0243340 A1 * | 11/2005 | Tai et al. | | 358/1.9 |
| 2006/0152764 A1 * | 7/2006 | Loce et al. | | 358/3.06 |

OTHER PUBLICATIONS

U.S. Appl. No. 10/923,116, filed Aug. 20, 2004, Zhang et al.
U.S. Appl. No. 11/013,787, filed Dec. 17, 2004, Xu et al.
U.S. Appl. NO. 11/034,057, filed Jan. 13, 2005, Loce, et al.
U.S. Appl. No. 11/104,758, filed Apr. 13, 2005, Xu, et al.

* cited by examiner

Primary Examiner — Benny Tieu
Assistant Examiner — Haris Sabah
(74) Attorney, Agent, or Firm — Fay Sharpe LLP (57) ABSTRACT

Aspects of color of a halftoned image are controlled or adjusted. A method for adjustment can include determining a color description of a color of an area or window associated with a target halftoned pixel, determining a desired adjustment to the color associated with the target pixel, determining a color change value based on the desired adjustment and the color description associated with the target pixel, combining the color change value with at least one value of the target halftoned pixel, thereby generating at least one combined target pixel value and quantizing the at least one combined target pixel value. For instance error diffusion and/or rank-ordered error diffusion is used to perform the quantization. Color adjustments can be based on user preference and/or calibration compensations between original and target devices.

24 Claims, 3 Drawing Sheets

COLOR MANAGEMENT OF HALFTONED IMAGES

BACKGROUND

Presently disclosed embodiments are related to image color management, adjustment and/or control. Disclosed embodiments are directed to the color management of color halftoned or binary images. Embodiments are beneficially applied wherever image or pixel data is quantized to such an extent as to render traditional contone value-based corrections, compensations, calibrations and adjustments impractical or ineffective.

There are many applications where it is desirable to be able to adjust one or more aspects of the color of an image or image portion. For instance, a user or document processor operator may determine that it is desirable to adjust the brightness, contrast, saturation, hue or color balance of an image. Where respective portions of a document are to be rendered on a plurality of print engines, it may be desirable to adjust one or more aspects of color of one or more of the respective document portions in order to maintain or control color consistency across the rendering space of multiple print engines. Also, uniformity variations can occur across the rendering space of a single print engine. In such instances, it may be desirable to adjust one or more aspects of color of an image or portions of an image in a spatially dependent manner across such a single print engine rendering space. Additionally, or alternatively, an image or image portion may be prepared for rendering on a first device having a first color response. Nevertheless, there may be a desire to render the image or image portion on the second device having a second color response. Alternatively, the characteristics of a rendering device may change overtime or due to environmental factors such as temperature and humidity. Therefore, the rendering device may have a second color response. In such circumstances, it is often desirable to adjust image data that was prepared for rendering with or on a first or original rendering device for rendering on a second or changed target device.

Image data is sometimes available in the form of continuous tone or contone data. For instance, in contone image data, colors are described in terms of two or more planes or separations. For example, the planes or separations may describe colorant densities or colorant amounts in a continuous range of from, for example, integer values from 0 to 255. The planes or separations may describe sensor readings of a scanned image in, for example, a red, green, blue (RGB) color space where numbers in a similar range describe an intensity of reflected light of each respective color. Alternatively, the planes or separations may describe a color in terms of a machine independent color space such as in terms of the industry standard L*a*b* color space or in terms of the tristimulus values of the CIE XYZ color space, or in terms of a printer color space, such as, for example, a cyan, magenta, yellow, black (CMYK) color space.

Where image data is available in contone format, tone reproduction curves (TRCs) can be used to adjust pixel values to compensate for the characteristics or color response of a particular rendering device or marking engine. Additionally, or alternatively, values associated with particular planes or separations can be adjusted in accord with a user's color adjustment preference to control, for example, brightness, contrast, hue, saturation and other color parameters.

However, image descriptions are not always available in terms of contone values. Sometimes, image descriptions are only available in what is referred to as a binary or quantized format. Binary image description formats are useful because many rendering devices, such as, for example, marking engines, are limited to placing a mark or not placing a mark at any given pixel location. Binary image formats describe an image in terms of placing a mark or not placing a mark. Even where pixels are referred to as—high addressable—and are described with reference to more than two states or quantization levels, ultimately, high addressable quantization values describe binary states of a cluster of spots wherein each member of the cluster is either marked or unmarked.

These quantized or binary image descriptions are often generated by applying a halftoning or quantization process to an image described in terms of contone values, page description language and the like. Therefore, we refer to such binary or quantized image descriptions as halftoned.

A received halftoned image or image description may be the direct or indirect result of a halftoning process. For example, a rendered or printed halftoned image may be scanned. Even though the scanning process generates contone values, the scanned image data is binary or quantized in nature because the scanned image data will contain very few different quantization levels. For example, the quantization levels of the scanned image data will be near the extremes of the available contone range. For instance, the scanned image data of a halftoned or a rasterized image will contain only values near 0 and 255 (in an 8-bit system) with some intermediate values generated due to sensor/spot alignment issues and the like. All images having these binary or nearly binary characteristics are referred to herein as halftone images.

The limited gray-scale resolution with which pixels in a halftoned image describe desired lightness levels or shades of gray (or color) limits the usefulness of compensating TRCs for generating compensated values. For example, where a compensating TRC may be used to determine that a compensated value for a shade of gray represented by the number 100 might be a value of 103, a similar tone reproduction curve could not be used to determine a corrected value where an input value must select an output value from an available range of values of only 0 and 1, on and off, or full scale dark and full scale light. Therefore, it has not been possible or practical to use compensating TRCs and the like to compensate or adjust the color of halftoned images.

Nevertheless, there has been a desire to adjust or compensate images based on user preference and/or rendering device changes, in systems where image data is only available in a halftoned form.

INCORPORATION BY REFERENCE

The disclosures of U.S. Patent Application Publication No. U.S. 2004/0257619 A1 by Loce, et al., published Dec. 23, 2004, entitled METHOD FOR COLOR RENDERING USING SCANNED HALFTONE CLASSIFICATION; U.S. Patent Application Publication No. U.S. 2003/0090729 A1 by Loce, et al., published May 15, 2003, entitled RANK-ORDER ERROR DIFFUSION IMAGE PROCESSING; U.S. patent application Ser. No. 10/923,116, filed Aug. 20, 2004 by Zhang, et al., entitled UNIFORMITY COMPENSATION IN HALFTONED IMAGES; U.S. patent application Ser. No. 11/104,758, filed Apr. 13, 2005 by Xu, et al., entitled BLENDED ERROR DIFFUSION AND ADAPTIVE QUANTIZATION; U.S. patent application Ser. No. 11/013,787, filed Dec. 17, 2004, Xu, et al., entitled SYSTEMS AND METHODS FOR RANK-ORDER ERROR DIFFUSION IMAGE PROCESSING; and U.S. patent application Ser. No. 11/034,057, filed Jan. 13, 2005 by Loce, et al., entitled SYSTEMS AND METHODS FOR CONTROLLING A TONE REPRODUCTION CURVE USING ERROR DIFFUSION are incorporated herein by reference in their entirety.

BRIEF DESCRIPTION

A method for adjusting color of a halftoned image or image portion can include determining a color description of a color of an area associated with a target halftoned pixel of the halftoned image or image portion, determining a desired adjustment to the color associated with the target pixel, determining a color change value based on the desired adjustment and the color description associated with the target pixel, combining the color change value with at least one value of the target halftoned pixel, thereby generating at least one combined target pixel value and quantizing the at least one combined target pixel value.

Some embodiments include a method that is operative to adjust a color halftoned image or image portion. For each pixel in the image or image portion for which adjustment is desired the method can include selecting a halftoned pixel of the halftoned image or image portion to be a target pixel, estimating a description of a color associated with the target pixel based on a plurality of color planes, determining a desired color adjustment for the estimated color description associated with the target pixel, determining at least one change value for at least one color plane of the target pixel based on the estimated color description and the desired color adjustment, combining the at least one change value with at least one value of the target pixel, thereby generating an adjusted target pixel and quantizing the adjusted target pixel.

Quantizing can include distribution error associated with the combining of values through various forms of error diffusion and/or rank-ordered error diffusion.

An image processing system that is operative to adjust color halftoned images can include a color estimator, a color adjustor, a combiner and a quantizer. For instance the color estimator can be operative to receive a halftoned color image or image portion and estimate colors associated with halftoned target pixels of the halftoned color image or image portion. The color adjustor can be operative to determine color change values for the estimated colors based on a user preference and/or a calibration compensation. The combiner can be operative to combine respective determined color change values with values of respective halftoned target pixels, thereby generating adjusted target pixel values. The quantizer can be operative to quantize the adjusted target pixel values.

DETAILED DESCRIPTION

Figure 1:
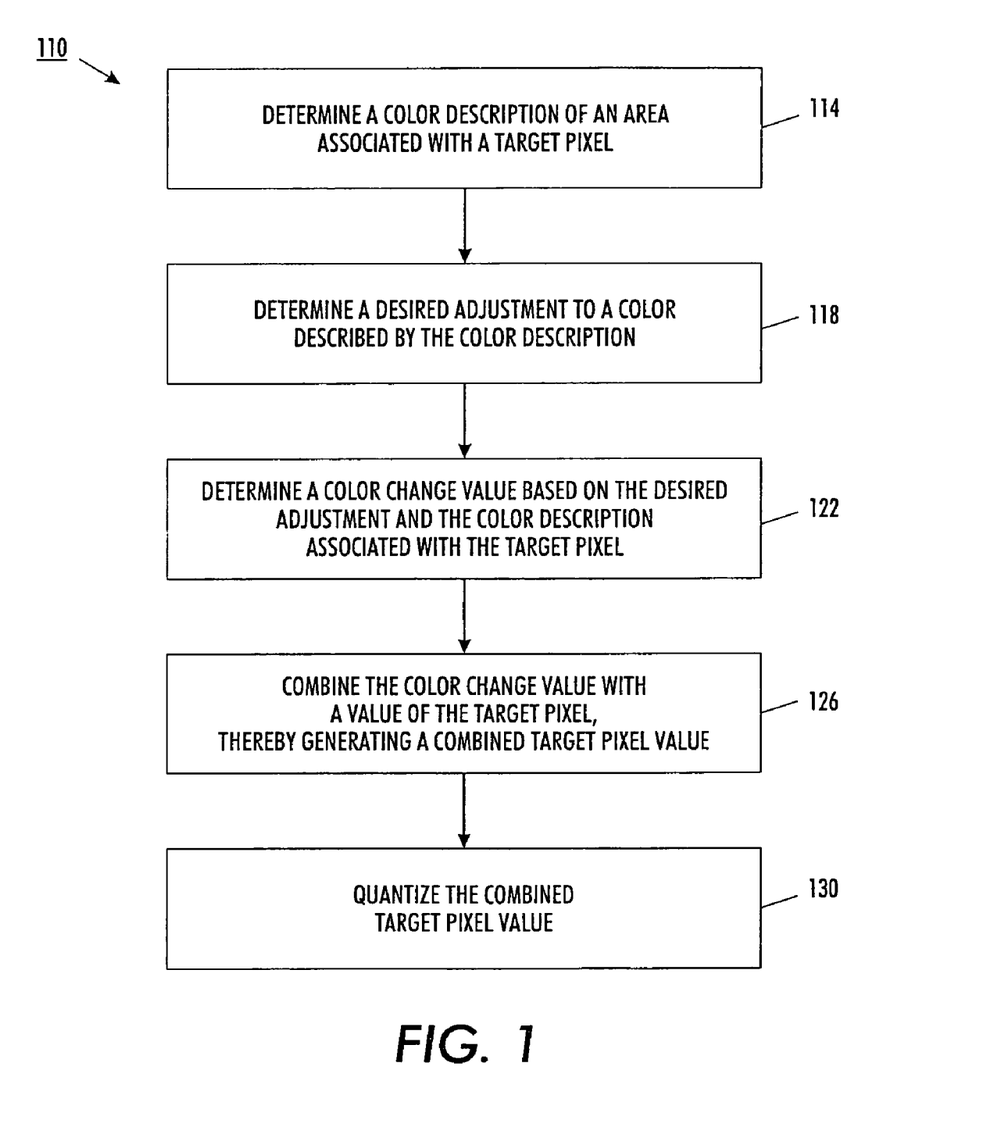
FIG. 1 and FIG. 2 are flow charts outlining methods for controlling or adjusting aspects of color in a halftoned image or image portion.

Referring to FIG. 1, a method 110 for adjusting color of a halftone or binary image or image portion can include determining 114 a color description of an area associated with a target pixel, determining 118 a desired adjustment to a color described by the color description, determining 122 a color change value based on the desired adjustment and the color description associated with the target pixel, combining 126 the color change value with a value of the target pixel, thereby generating a combined pixel value and quantizing 130 the combined target pixel value.

The quantization of pixels in a halftoned image is so severe that it is almost meaningless to discuss the color of a particular pixel. Instead, color information is dispersed in an area or neighborhood about a target pixel. Therefore, values of pixels neighboring a target pixel are considered when determining 114 a color description to associate with the target pixel. For instance, windows are logically placed about a target pixel. For example, the size and shape of the windows may be selected to reflect the size and shape of halftone cells of halftone screens known to have been used to generate the halftone pixel values of an image or image portion being processed. For instance, one window is selected for each separation or color plane of the pixel. Alternatively, the windows may be selected based on the size and shape of windows known to have been used during an error diffusion or rank-ordered error diffusion procedure that is known to have been used to generate the halftoned image or image portion being processed. Alternatively, the windows are selected on some other basis. For instance, default windows are used when authoring information regarding the image being processed is unknown or incomplete.

The windows identify halftone pixels to be considered when determining 114 the color description of an area associated with the target pixel. For instance, determining the color of the area associated with the target pixel may include low-pass filtering or determining a weighted average of pixel values from an area of the image including the target pixel. For instance, the area is defined by the selected windows. Weighted averages may be determined for each of the planes or separations that describe the pixels. Each of the pixels within a window may be given the same weight for the purpose of determining an average value for a particular plane or separation. Alternatively, the values of pixels at particular positions relative to the target pixel may be weighted more or less heavily as compared to other pixels within the window. For instance, pixels closer to the target pixel may have an added influence in determining 114 the color description as compared to pixels that are located more remotely. Alternatively, the distribution of weights may be related to the distribution of threshold values associated with halftone screens used to generate the image or image portion being processed or to other factors.

Additionally, or alternatively, determining 114 the color description of the area associated with the target pixel may include the use of a color mixing formula. For instance, a color mixing formula identifies an effect of combinations of color planes or separations on particular aspects or perceived characteristics of a color. For example, an illustrative color mixing formula related to brightness is:

$$\text{Brightness}=1-\{(\alpha_1 C+\alpha_2 M+\alpha_3 Y)\times(1-K)\} \quad (1)$$

where the alphas represent the relative strengths with which contone-like C, M, Y, K values resulting from a low-pass filtering contribute to a perceived brightness. In some embodiments, the alphas sum to unity. In some implementations, equal weights are given to each of the color separations (e.g., C, M, Y). For example, $\alpha_1=\alpha_2=\alpha_3=\frac{1}{3}$. Other implementations might give a greater weight to, for example, the magenta colorant and less weight to the yellow colorant. For instance, in some embodiments, $\alpha_1=0.3$, $\alpha_2=0.5$ and $\alpha_3=0.2$. Such a color mixing formula might be applied when a user or document processor operator desires to adjust the brightness of a halftoned color image. For example, the average or weighted average of halftoned pixel values from an area of the image including the target pixel is determined and the average or weighted average is processed through a color mixing formula in order to determine 114 a color description, such as the brightness description described above, or some other color description associated with the target pixel.

Determining 114 the color description of the area associated with the target pixel can include using any other colorant mixing formula. For example, some color mixing formulas take into account information about the color characteristics of an original device, such as an authoring device or a device by which the halftoned image was intended to be rendered. Additionally, or alternatively, some color mixing formulas take into account color characteristics of a target device or a virtual reference device.

Some color mixing formulas provide a conversion from a first or input color space to a second or convenient color space. For example, it may be easier to determine 118 a desired adjustment or determine 122 a desired color change value when colors of the input image (or associated with the target pixel) are described in terms of a color space other than the color space of the original or input halftoned image.

For example, $$RGB = V - A \times CMY \qquad (2)$$

where RGB, V and CMY are 3×1 vectors, and A is a 3×3 color mixing matrix describes a conversion from a CMY color space of an illustrative input color halftoned image to an RGB (red, green, blue) color space. For example, the RGB color space color description may be more convenient than the CMY color space of the input image if a user desires to adjust the redness, greenness, blueness or tint of the image. If the illustrative input image also includes a black (K) separation or color plane, it may be accounted for via an extra operation subsequent to Equation (2), given by:

$$R' = R(1-K),$$

$$G' = G(1-K),$$

$$B' = B(1-K). \qquad (2a)$$

In the simplest instantiation of Eq. 2, V can be a unit vector, and A is an identity matrix. In this case, Eq. 2 and 2a reduce to:

$$R' = (1-C)(1-K)$$

$$G' = (1-M)(1-K)$$

$$B' = (1-Y)(1-K) \qquad (2b)$$

In more sophisticated instantiations, V and A include parameters or values that take into account color characteristics of original and/or target devices.

In some implementations, it is not necessary to perform low-pass filtering, averaging or weighted averaging in order to provide an estimated color as input to a color mixing formula. That is, some color mixing formulas are adapted to consider input from an area around a target pixel (or information from a target pixel and pixels neighboring the target pixel). Therefore, determining 114 the color description of the area associated with the target pixel can include processing halftone pixel values from an area of the image including the target pixels through a color mixing formula that takes into account color plane interactions or correlations. For instance, a color mixing formula based on a Neugebauer model considers input from a plurality of pixels. For instance, such a mixing formula can be used to determine an average color associated with an area around a target pixel in terms of a device independent color space. For example, a Neugebauer model-based color mixing formula can be used to determine 114 a color description in terms of the Commission Internationale de l'Eclairage (CIE) XYZ tristimulus values. For instance, the tristimulus values are determined relative to a local area of, for example, an illustrative CMYK based halftoned image.

For example, through a calibration procedure associated with the original device and/or the target device xyz tristimulus values can be determined for all the solid overprints. For instance, for the CMYK original device of the illustrative halftoned image, there are sixteen overprints to consider (i.e., all combinations of 0% and 100% area coverage for the four colorants (cyan, magenta, yellow and black)). Therefore, within a given local area or window (e.g., surrounding or including a target pixel) of an image, it is possible to estimate representative weights for each of these sixteen overprints. One way is to map each pixel color to the closest overprint color and count the pixels corresponding to each overprint. These counts can then be divided by the total number of pixels in the area or window being considered. The tristimulus values associated with the local area are simply the weighted average of the tristimulus values of the overprints, weighted by the fractional counts of the overprints. For instance, the tristimulus value X can be calculated for a given area associated with the target pixel from the expression:

$$X = \sum_{i=1}^{16} w_i X_i \qquad (3)$$

where X is the tristimulus value of the local area, $X_i$ is the tristimulus value of the $i^{th}$ overprint, and $w_i$ is the fractional count of the $i^{th}$ overprint, or the percentage of pixels in the local area associated with the value of the $i^{th}$ overprint. Similar equations are operative for the Y and Z tristimulus values. Furthermore, similar equations can be written for the parameters or values of other color spaces. For instance, similar equations or color mixing formulae are applicable to conversion to the red, green, blue (RGB) color space and the CIE L*a*b* color space.

Notably, each of these determined 114 color descriptions (i.e., the result of low-pass filtering, averaging, weighted averaging, Eq. 1, Eq. 2, Eq. 3) is an estimate based on a plurality of color planes.

As indicated above, determining 118 the desired adjustment to the color described by the determined 114 color description can be a determination 118 based on a user preference and/or based on a compensation for a change in a target rendering device. As such, determining 118 the desired adjustment can occur before, during or after the determination 114 of the color description of the area associated with the target pixel.

For instance, a user may determine 118 a desire to lighten or darken the image, to adjust the contrast of the image or image portion, or to make some other adjustment prior to colorant description estimation or determination 114. For instance, the user may make the determination 118 of a desired adjustment based on a review of an unprocessed test print or print emulation presented on a display device. Alternatively, the test print or display may be made on the basis of a plurality of determined 114 color descriptions for a plurality of target pixels.

If the desired adjustment is to be determined 118 on the basis of a calibration or response change between an original device and a target device, the desired adjustment may be a function of color. Therefore, colors may need to be determined 114 prior to determining 118 a desired adjustment. For instance, the original rendering device and the target rendering device may have the same or similar color characteristics with regard to a cyan separation or color plane while having different color characteristics with regard to a magenta separation or color plane. Therefore, if determined 114 color descriptions describe colors that do not require or are not associated with a magenta color plane, the determined 118 adjustment may be very small or may be zero, while determined 114 color descriptions that are associated with a significant amount of magenta colorant or have a high value associated with a magenta separation or color plane, it may be determined 118 that a significant adjustment, correction or compensation is desired.

Determining 122 the color change value may include applying a relationship between the determined 118 desired adjustment and changes in colorant amounts or color plane values. For instance, a determined 118 desired adjustment in brightness may lead to a determination 122 of several color change values related to several color separations. Where the determined 118 desired adjustments are related to calibration or characteristics compensations, the determined 118 desired adjustments may call for cross channel compensations or determined 122 change values. For instance, where the first or original device uses different colorants than those used by a target device, a color calling for a single colorant in the original device may require the use or blending of several colorants in the target device. Such required blending would lead to the determination 122 of change values in several color planes. In other cases, determined 118 adjustments may lead more directly to determine 122 change values. For instance, where the original or input halftoned image or image portion is described in terms of a red, green, blue (RGB) color space and where the determined 118 desired adjustment is a specified change or compensation in redness or blueness, the determination 122 of the color change value may follow directly from the determination 118 of the desired adjustment.

Some illustrative scenarios may be instructive. For instance, an input image may be received in the form of a halftoned CMYK color space image. A color description is determined 114 by, for example, low pass filtering and/or processing a portion of the image through a colorant mixing formula which generates a color description in terms of $L^*a^*b^*$. The $L^*a^*b^*$ color description is determined 114, for example, because the $L^*a^*b^*$ color space is convenient because of its relevance to human visual perception, machine independence. An adjustment is determined 118 and applied to the determined 114 color description to generate an adjusted $L^*a^*b^*$ color description. The adjusted $L^*a^*b^*$ color description is converted to the color space of the input image (e.g., CMYK) to generate an adjusted CMYK-based contone description of the image. If the input halftoned image was low-pass filtered or averaged as part of the process to generate or determine 114 the $L^*a^*b^*$ color description, then the adjusted CMYK-based contone description can be compared to a contone-like result of the low-pass filtering or averaging to generate or determine 122 a color change value. Alternatively, if, for example, the $L^*a^*b^*$ color description was generated or determined 114 through a process that did not include averaging or low-pass filtering, such as, for example, through a process similar to that described above with reference to Eq. (3), then the $L^*a^*b^*$ color description may also be converted to the color space of the input image (e.g., CMYK) to provide an unadjusted CMYK-based contone description for comparison with the adjusted CMYK-based contone description for the purpose of determining 122 color change value(s).

These color spaces are illustrative only. The input image may be in any color space and may or may not be converted to some other convenient color space for the purposes of determining 118 an adjustment. For example, the input halftoned image or image portion may be in a CMYK color space and be converted to an RGB color space. Alternatively, the input halftoned image may be in terms of an RGB color space and may be converted to a CMYK, $L^*a^*b^*$, CIE XYZ color space and/or any other convenient color space. The general process is the same. A color description for the target pixel is determined 114 in a convenient color or aspect space. An adjustment is determined 118 and applied to that convenient color or aspect space color description. At some point, a contone-like color description in the same color space as the input halftoned image is generated and compared to determined 118 adjusted color associated with the target pixel to generate or determine 122 the at least one color change value (i.e., for one or more separation or color plane).

In an experimental embodiment, the input halftoned image was in an RGB color space. An area about a target pixel was low-pass filtered to determine 114 a color description associated with the target pixel. An adjustment was applied to that contone-like determined 114 color description. Instead of comparing the determined 118 adjusted RGB color description to the contone-like determined 114 color description, both color descriptions were converted to a CMYK color space to facilitate rendering on a CMYK based printer. The CMYK version of the determined 114 unadjusted color description was compared to the determined 118 adjusted color description to determine 122 a color change value. The original input RGB color space halftoned image was also converted or transformed to a CMYK based halftoned image. The determined 122 color change value was then combined 126 with a value of a target pixel (albeit a transformed value of a target pixel), thereby generating a combined target pixel value. Alternatively, the color change value determination 122 and combination 126 could have been performed in the original color space (e.g., RGB) and conversion to CMYK for printing could have occurred at a later stage.

When determining 122 the color change value includes a conversion back to an original color space, the conversion may or may not be based on an inversion of a color mixing formula used to determine 114 the convenient color description. For instance, referring to Eq. 1, when determining 118 a desired adjustment results in a new or adjusted brightness level, a brightness change may be determined between the new brightness level and the brightness determined 114 through the color mixing formula (e.g., Eq. 1). That brightness change may be used to determine a color change value for only a black (i.e., K) separation. Alternatively, additional constraints may be employed to provide a means for calculating color change values for one or more of the other separations (i.e., CMY).

Regarding Eq. 2, one method for converting RGB values of a new or adjusted RGB-based color description to a new or adjusted CMYK-based color description is through the use of the following:

$K_{new} = K(1 - \alpha_1 R_{new} - \alpha_2 G_{new} - \alpha_3 B_{new})/(1 - \alpha_1 R - \alpha_2 G - \alpha_3 B)$ $R' = R_{new}/(1 - K_{new}), G' = G_{new}/(1 - K_{new}), B' = B_{new}/(1 - K_{new})$ $CMY_{new} = A^{-1}(V - RGB')$ The first equation calculates a new K value based on the ratio of original to adjusted brightness values; while the last two equations are essentially an inverse of Equations 2 and 2a.

An inverse formula based on the Neugebauer model (e.g., Eq. 3) may be obtained by inverting the forward inverse mixing equations. These equations are non-linear. Therefore, inversion is often achieved through numerical approximation techniques. In some cases, for example, where CMYK-based color descriptions are converted to XYZ color descriptions, the inversion or reverse transformation is underdetermined in that many CMYK values can produce the same XYZ value. Therefore, additional constraints are used to select a unique CMYK value during the inverse transformation.

However the color change value is determined 122, the color change value is combined 126 with a value of the halftoned target pixel thereby generating a combined target pixel value. The combined target pixel value is then quantized 130 as part of a process that generates a rehalftoned image.

For example, the combined target pixel value is quantized 130 through error diffusion or rank-ordered error diffusion, thereby distributing an influence of the determined 122 color change value among pixels neighboring the target pixel.

In error diffusion or rank-ordered error diffusion, pixel values are limited to a particular range (e.g., 0 to 1, 0 to 255 or some other convenient or useful range). To the extent that some influence of an imaging process would drive a value of a pixel outside of the allowed range, that influence is distributed to neighboring pixels. For example, in standard error diffusion, a window defining a neighborhood about a target pixel is selected. The pixels neighboring the target pixel within the window are assigned weights, usually based on relative positions of the neighboring pixels to the target pixel. So, for example, if a target pixel is at a threshold value associated with its allowed range (e.g., 0 or 255) and some influence of an imaging process, such as the distribution of error from a previously processed pixel, would drive the value of the target pixel beyond its allowed range (e.g., below 0 or above 255), the error diffusion process passes the amount of the influence that would drive the target pixel beyond its allowed range (referred to as error) to one or more of the pixels within the selected window. For instance, a first pixel might receive 50% of the error, a second pixel might receive 30% of the error and a third and fourth pixel might receive 10% of the error each.

In rank-ordered error diffusion, pixels within a selected window are ranked according to respective pixel values of the pixels, and error is distributed according to that ranking. For example, pixels are ranked according to darkness in a particular color plane or separation. Error that would have driven the target pixel beyond a dark threshold is distributed first to the darkest pixels within the selected window. Error that would have driven the target pixel beyond a lightest allowable value is distributed first to the lightest pixels within the window. Error remaining after this initial distribution is distributed to remaining pixels in the window according to their respective ranks. In this way, rank-ordered error diffusion concentrates lightness and darkness and tends to avoid dot fragmentation which can give an image a grainy or snowy appearance and can amplify the perceptibility of non-ideal aspects of dot gain characteristics of an imaging process or rendering device.

Error diffusion and rank-ordered diffusion functions can be adapted, modified or optimized in a multitude of ways. For example, error diffusion and rank-ordered error diffusion can be blended in a manner that reduces objectionable moiré sometimes produced by rank-ordered error diffusion while at the same time reducing large gray errors and dot or spot fragmentation sometimes associated with standard or conventional error diffusion. In some forms of error diffusion and/or rank-ordered error diffusion, some error may be discarded. Error diffusion techniques can be adapted to accommodate high addressability. That is, error can be distributed on the basis of more than just the two thresholds or limits (e.g., 0 and 255) in order to accommodate sub-pixel marking decisions associated with high-addressability pixels. Furthermore, these error diffusion techniques can be adaptive with regard to the number of thresholds considered so that bi-level quantization is accommodated for some portions of an image and multi-level/high-addressable quantization is used in other portions of the image.

Quantizing 130 the combined target pixel value can include using any of these forms of error diffusion or rank-ordered error diffusion as well as other forms known or yet to be developed to distribute error associated with the combination 126 of the color change value(s) and the value(s) of the target pixel. Furthermore, quantizing 130 may include using other halftoning techniques.

Figure 2:
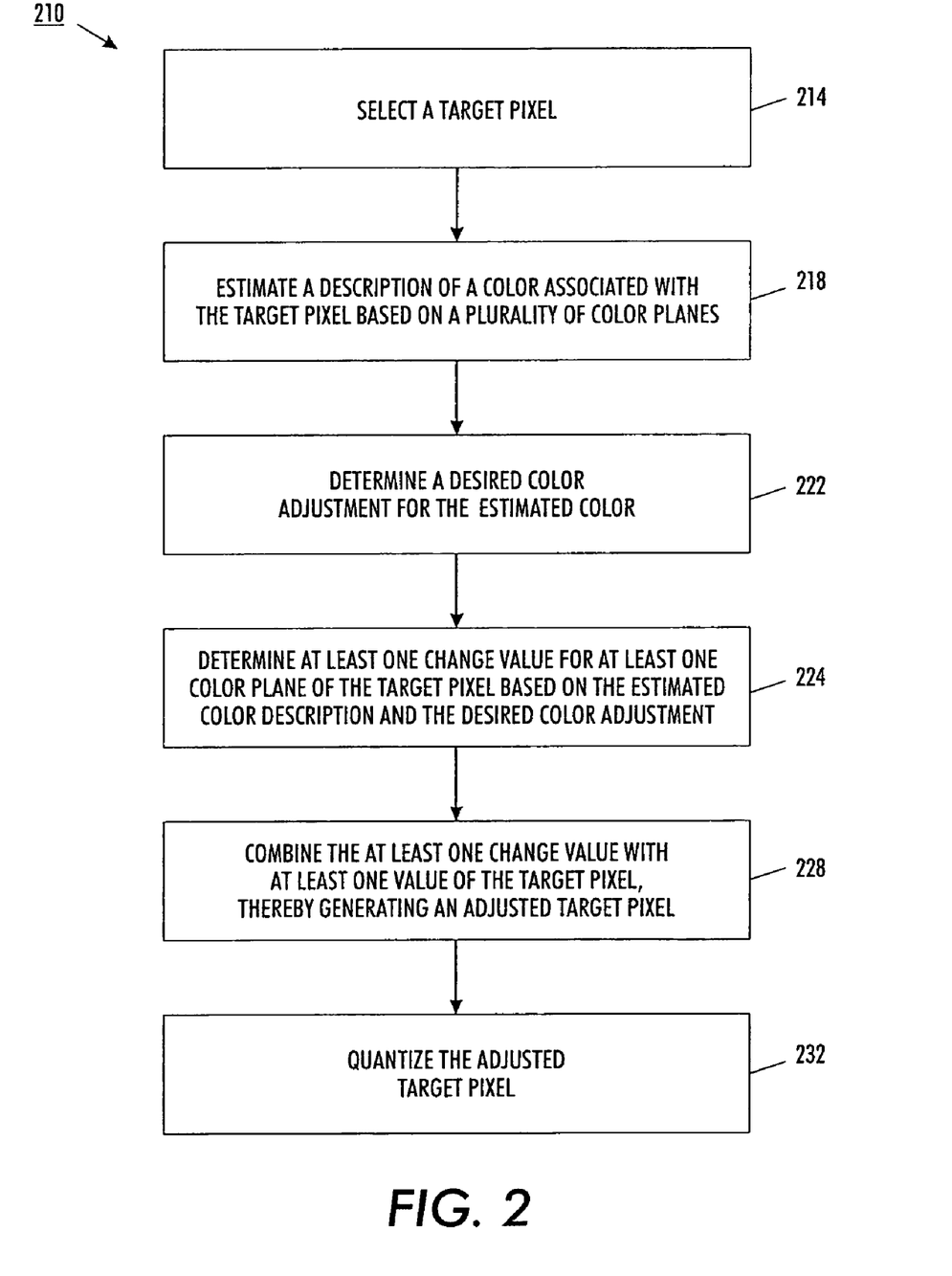

An illustrative embodiment of a method 210 that is operative to adjust a color of a halftoned image includes selecting 214 a target pixel, estimating 218 a description of a color associated with the target pixel based on a plurality of color planes associated with the target pixel, determining 222 a desired color adjustment for the estimated 218 color or an adjusted color description, determining 224 at least one change value for at least one color plane of the target pixel, or transformed version thereof, based on the estimated 218 color description and the determined 222 desired color adjustment, combining 228 the at least one change value with at least one value of the target pixel, or transformed version thereof, thereby generating an adjusted target pixel and quantizing 232 the adjusted target pixel. This procedure (214-232) can be performed for every pixel in a selected image. It is to be understood that the selected image may be a sub-portion or sub-image of a larger image.

Estimating 218 the description of the color associated with the target pixel can include low-pass filtering halftoned pixel values of the target pixel and at least one pixel neighboring the target pixel. Since the method 210 is for processing color images, the low-pass filtering is carried out for at least two color planes associated with the target pixel. For example, the low-pass filtering may be an averaging or weighted averaging or other form of low-pass filtering or descreening. In some embodiments, the results of the low-pass filtering are used as the estimated 218 color description. In other embodiments, the low-pass filter results related to the at least two color planes are combined or processed in, with or through a color mixing formula (e.g., Eq. 1, Eq. 2). In some embodiments, filtering or averaging is included within the processes of a color mixing formula (e.g., Eq. 3). Therefore, in some embodiments, estimating 218 the color includes combining pixel values in at least two color planes of the target pixel in, with or through a color mixing formula. For instance, the color mixing formula could be based on a Neugebauer model.

Determining 222 the desired color adjustment can include determining one or more of a desired adjustment in brightness, contrast, saturation, hue or color balance. Additionally, or alternatively, determining 222 the desired color adjustment can include determining a compensation based on a difference between an original device and a target device. The target device may be the same physical device as the original device or the target device may be a different physical device. For instance, the original device may have undergone some change due to wear or environmental changes, such as temperature or humidity. Therefore, determining 222 the desired color adjustment can include determining a compensation for the change over time of the original device. Alternatively, it may be desired to render an image prepared for rendering on a first device on some second device. For instance, this may occur when an image is prepared for viewing or rendering on a proofing device but is to be produced on one or more different production devices. In another scenario, an image may be prepared for rendering on a first print engine. However, the first print engine may become unavailable. Alternatively, in order to increase throughput, it may be desirable to render the image on a second, third or additional print engines. In all of these cases, determining 222 the desired color change or adjustment can include determining a compensation based on a difference between an original device and a target device.

Determining 224 at least one change value can include determining at least one change value in at least one color plane associated with the target pixel or transformed version of the target pixel. For instance, determining the at least one change value can include determining an adjusted color value for the target pixel based on the determined 222 desired color adjustment, determining a color difference between the adjusted color value and the color estimate and using the determined difference as the at least one change value.

As indicated above, determining 224 the at least one change value can also include converting the determined 218 color estimate from a color estimate description in a color space of an output of a color mixing formula into a color estimate description in a color space of the original target pixel, converting the determined 222 adjusted color value from an adjusted color value description in a color space of an output of a color mixing formula into an adjusted color value description in the color space of the target pixel, determining a color difference between the converted adjusted color value and the converted color estimate and using the color difference description in the color space of the target pixel as the at least one change value.

Quantizing 232 the adjusted target pixel can include distributing error associated with the combination 228 of the at least one change value with at least one value of the original halftoned target pixel according to error diffusion, rank-ordered error diffusion or other halftoning technique as described above.

Figure 3:
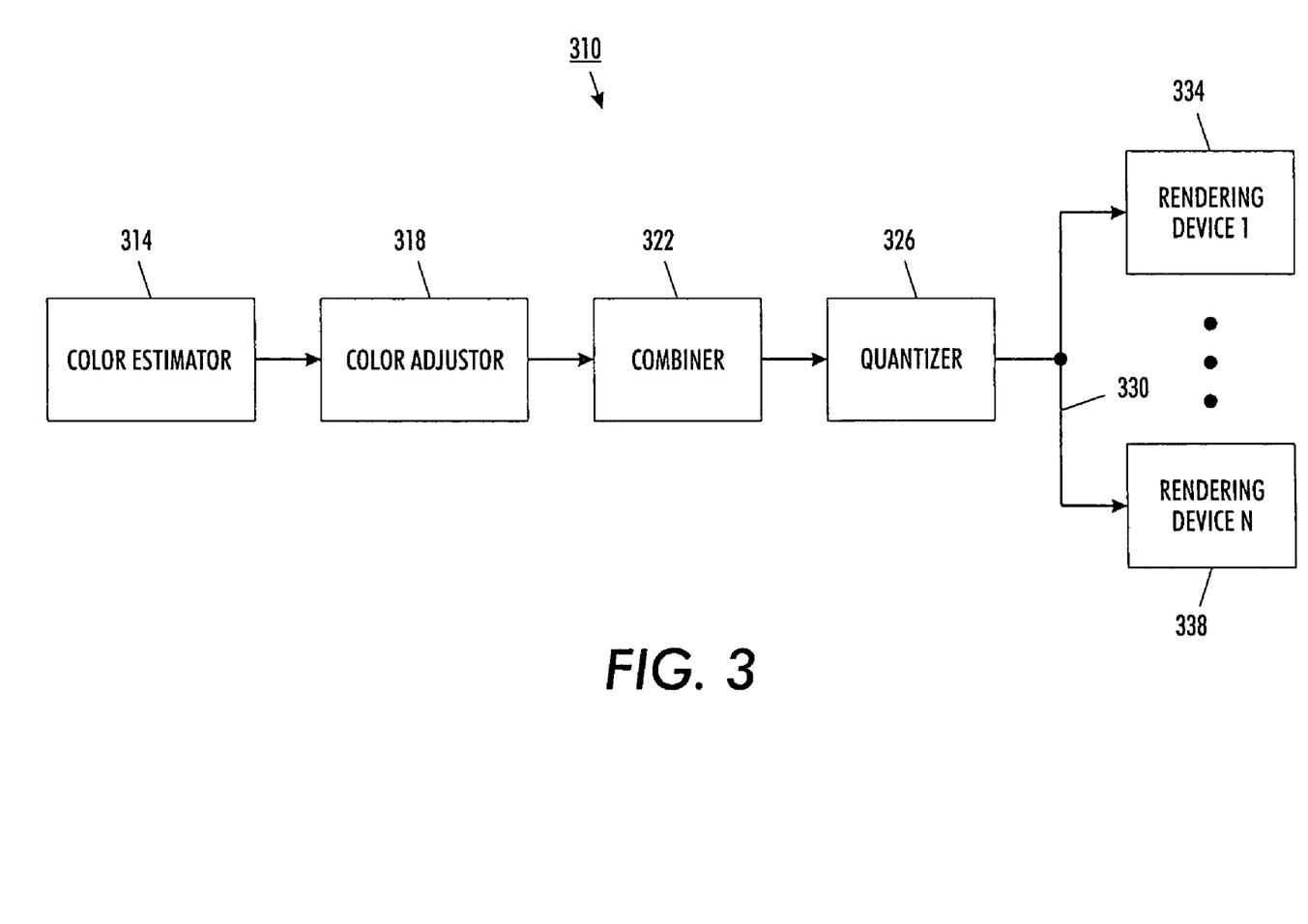
FIG. 3 is a block diagram of a system that is operative to perform the methods of FIG. 1 or FIG. 2.

Referring to FIG. 3, an image processing system 310 can include a color estimator 314, a color adjustor 318, a combiner 322 and a quantizer 326.

For example, color estimator 314 can be operative to determine 114 or estimate 218 colors associated with halftoned target pixels. For instance, the color estimator 314 may lowpass filter halftoned pixel values of target pixels and pixels neighboring the target pixels. This low-pass filtering may be carried out in at least two color planes associated with the target pixels. In some embodiments or applications, the color estimator 314 processes pixel values of at least two color planes of or associated with the target pixel in a color mixing formula (e.g., Eq. 1, Eq. 2, Eq. 3). The pixel values may be of the target pixel and pixels neighboring the target pixel. In some embodiments or applications, the color estimator 314 processes at least two color plane outputs of a low-pass filter output associated with the target pixel and pixels neighboring the target pixel through a color mixing formula as described above. The color mixing formula can be any color mixing formula, including, but not limited to, a brightness formula (e.g., Eq. 1), a color mixing formula based on a Neugebauer model (e.g., Eq. 3), the simple color space transformation between RGB and CMYK (e.g., Eq. 2) described above or other color mixing formulae.

The color adjuster 318 can be operative to determine 122, 222 color change values for estimated 214 or determined 114 colors based on desired adjustments in brightness, contrast, saturation, hue, color balance or other aspects of color. For example, a user or system operator may indicate desired adjustments based on a previously rendered version of the image or based on an evaluation of an emulated image provided on a display. Additionally, or alternatively, a color adjuster 318 may be operative to determine 118, 222 one or more color change values based on a compensation based on a difference between an original device and a target device. For instance, the system 310 may include or be in communication with one or more rendering devices. For instance, a communication path 330 may include one or more network connections and/or transportable computer media, such as floppy disks, memory cards and CD ROMS. An input image may have been prepared for rendering on a first rendering device (e.g., 334). Characteristics of the first rendering device 334 may have changed over time or due to environmental changes, such as temperature and humidity. The color adjuster 318 may be operative to determine 118, 222 color change values for estimated colors based on compensations based on a difference between a state of the first rendering device 334 when the image was prepared for rendering and a current state of the first rendering device 334. Alternatively, there may be a desire to render the image on one or more of a plurality of other rendering devices, such as, for example, an $n^{th}$ rendering device 338. Therefore, in some embodiments or applications, the color adjuster 318 is operative to determine 118, 222 color change values for estimated 114, 218 colors based on a compensation based on a difference between, for example, the first rendering device 334 and the $n^{th}$ rendering device 338.

For example, the color adjuster 318 is operative to determine 122, 224 at least one color change value by determining 118, 222 adjusted color values for the target pixels based on the desired adjustment, determining color differences between the adjusted color values and the estimated 114, 218 colors, using the determine difference as the change values or converting the color estimates and the adjusted color values from a color space of a color mixing formula into color estimates and adjusted color value descriptions in a color space of the target pixels and determining color differences between the transformed color estimates and the transformed adjusted color values.

The combiner can be operative to combine 126, 228 respective determined 122, 224 color change values with values of respective original halftoned target pixels (or transformed versions thereof), thereby generating adjusted target pixel values.

The quantizer 326 is operative to quantize 130, 232 the adjusted target pixel values. For example, the quantizer 326 is operative to quantize 130, 232 the adjusted target pixel values by quantizing 130, 232 the values of the adjusted target pixels according to error diffusion, rank-ordered error diffusion or a blended combination thereof. Quantizing values 130, 232 of the adjusted target pixels can include quantizing the values of the adjusted target pixels to one of two binary values according to a single threshold per value. Additionally, or alternatively, quantizing the values of the target pixel can include quantizing 130, 232 the values to one of at least three high-addressable quantization values according to at least two high-addressable quantization thresholds per pixel value.

If the system 310 includes or is in communication with one or more rendering devices (e.g., 334, 338), the rendering devices can include display devices, such as cathode ray tubes, liquid crystal displays and plasma displays. Additionally, or alternatively, the rendering devices (e.g., 334, 338) may include printers, such as ink jet, electrophotographic and/or xerographic printers.

The color estimator 314, color adjuster 318, combiner 322 and quantizer 326 may be implemented in various combinations of hardware and software.

It will be appreciated that the various above disclosed and other various features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The word "printer" as used in here encompasses any apparatus, such as a digital copier, book making machine, facsimile machine, multi-function machine, etc., which performs a print outputting function for any purpose.

The invention claimed is:

1. A method that is operative to adjust a color halftoned image or image portion, the method comprising:
    for each halftoned pixel in the image or image portion for which adjustment is desired:
        selecting the halftoned pixel of the halftoned image or image portion to be a target pixel;
        estimating a description of a color associated with the target pixel based on a plurality of color planes;
        determining a desired color adjustment for the estimated color description associated with the target pixel;
        determining at least one change value for at least one color plane of the target pixel based on the estimated color description and the desired color adjustment;
        combining the at least one change value with at least one value of the target pixel, thereby generating an adjusted target pixel; and
        quantizing the adjusted target pixel;
    thereby generating an adjusted halftoned image or image portion.

2. The method of claim 1 wherein estimating the color comprises:
    low pass filtering halftone pixel values of the target pixel and at least one pixel neighboring the target pixel in at least 2 color planes.

3. The method of claim 2 wherein estimating the color further comprises:
    combining the low pass filter results of the at least 2 color planes in a color mixing formula.

4. The method of claim 1 wherein estimating the color comprises:
    combining pixel values in at least 2 color planes of the target pixel in a color mixing formula.

5. The method of claim 4 wherein combining pixel values comprises:
    combining pixel values in a color mixing formula based on a Neugebauer model.

6. The method of claim 1 wherein determining the desired color adjustment for the halftoned image or image portion comprises:
    determining at least one of a desired adjustment in brightness, contrast, saturation, hue, or color balance and/or a compensation based on a difference between an original device and a target device.

7. The method of claim 1 wherein determining at least one change value comprises:
    determining an adjusted color value for the target pixel based on the desired adjustment;
    determining a color difference between the adjusted color value and the color estimate; and
    using the determined difference as the at least one change value.

8. The method of claim 1 wherein determining at least one change value comprises:
    determining an adjusted color value for the target pixel based on the desired adjustment;
    converting the color estimate from a color estimate description in a color space of an output of a color mixing formula into a color estimate description in a color space of the target pixel;
    converting the adjusted color value from an adjusted color value description in a color space of an output of a color mixing formula into an adjusted color value description in the color space of the target pixel;
    determining a color difference between the converted adjusted color value and the converted color estimate; and
    using the color difference description in the color space of the target pixel as the at least one change value.

9. The method of claim 1 wherein quantizing the adjusted target pixel comprises:
    quantizing values of the adjusted target pixel according to one of error diffusion and rank ordered error diffusion, wherein quantizing values of the adjusted target pixel includes at least one of one of quantizing the values of the adjusted target pixel to one of two binary values according to a single threshold per value and quantizing the values of the target pixel to one of at least three high addressable quantization values according to at least two high addressable quantization thresholds per value.

10. The method of claim 1 wherein the selecting, estimating, change value determination, combining and quantizing are performed by an image processing system.

11. A method for adjusting color of a halftoned image or image portion, the method comprising:
    for each halftoned pixel in the image or image portion:
        selecting the pixel as a target halftoned pixel;
        determining a color description of a color of an area associated with the target halftoned pixel of the halftoned image or image portion;
        determining a desired adjustment to the color associated with the target pixel;
        determining a color change value based on the desired adjustment and the color description associated with the target pixel;
        combining the color change value with at least one value of the target halftoned pixel, thereby generating at least one combined target pixel value; and
        quantizing the at least one combined target pixel value.

12. The method of claim 11 wherein determining the color description of the area associated with the target pixel comprises:
    determining a weighted average of halftoned pixel values from an area of the image or image portion including the target pixel; and
    processing the weighted average through a color mixing formula that takes into account color plane interactions or correlations.

13. The method of claim 11 wherein determining the color description of the area associated with the target pixels comprises:
    processing halftoned pixel values from an area of the image or image portion including the target pixels through a color mixing formula that takes into account color plane interactions or correlations.

14. The method of claim 12 wherein processing the weighted average through a color mixing formula further comprises:
processing the weighted average through a color mixing formula that takes into account at least one of color characteristics of an original device for which the halftoned image or image portion was originally generated, characteristics of a target device upon which it is desired to render a version of the halftoned image or image portion, characteristics of a virtual reference device, an angle of a halftone screen used to generate the halftoned image or image portion, a frequency of a halftone screen used to generate the halftoned image or image portion, and thresholds of a halftone screen used to generate the halftoned image or image portion.

15. The method of claim 13 wherein processing halftoned pixel values through a color mixing formula further comprises:
processing halftoned pixel values through a color mixing formula that takes into account at least one of color characteristics of an original device for which the halftoned image or image portion was originally generated, characteristics of a target device upon which it is desired to render a version of the halftoned image or image portion, characteristics of a virtual reference device, an angle of a halftone screen used to generate the halftoned image or image portion, a frequency of a halftone screen used to generate the halftoned image or image portion, and thresholds of a halftone screen used to generate the halftoned image or image portion.

16. The method of claim 11 wherein the determining of the color description, determining of the color change value, combining and quantizing are performed by an image processing system.

17. An image processing system comprising:
a color estimator that is operative to receive a halftoned color image or image portion described by a set of halftoned target pixels and estimate colors associated with the halftoned target pixels of the halftoned color image or image portion;
a color adjustor that is operative to determine color change values for the estimated colors based on a user preference and/or a calibration compensation;
a combiner that is operative to combine respective determined color change values with values of respective halftoned target pixels, thereby generating adjusted target pixel values; and
a quantizer that is operative to quantize the adjusted target pixel values.

18. The system of claim 17 wherein the color estimator is operative to estimate colors associated with target pixels by at least one of low pass filtering halftone pixel values of the target pixels and pixels neighboring the target pixels in at least 2 color planes, processing pixel values of at least 2 color planes of the target pixel in a color mixing formula and processing at least two color plane outputs of a low pass filter output associated with the target pixel and pixels neighboring the target pixel through a color mixing formula.

19. The system of claim 18 wherein the color estimator is operative to process pixel values of at least 2 color planes of the target pixel in a color mixing formula by processing the pixel values in a color mixing formula based on a Neugebauer model.

20. The system of claim 17 wherein the color adjustor is operative to determine color change values for the estimated colors based on at least one of desired adjustment in brightness, contrast, saturation, hue, or color balance and/or a compensation based on a difference between an original device and a target device.

21. The system of claim 17 wherein the color adjuster is operative to determine color change values by determining adjusted color values for the target pixels based on the desired adjustment, determining color differences between the adjusted color values and the estimated colors using the determined color difference as the change values or by converting the color estimate from a color estimate description in color space of an output of a color mixing formula into a color estimate description in a color space of the target pixel and converting the adjusted color value from an adjusted color value description in a color space of an output of a color mixing formula into an adjusted color value description in the color space of the target pixel and using the color difference description in the color space of the target pixel as the at least one change value.

22. The system of claim 17 wherein the quantizer is operative to quantize the adjusted target pixel value by quantizing the values of the adjusted target pixels according to one of error diffusion and rank ordered error diffusion, wherein quantizing values of the adjusted target pixels includes at least one of one of quantizing the values of the adjusted target pixel to one of two binary values according to a single threshold per value and quantizing the values of the target pixel to one of at least three high addressable quantization values according to at least two high addressable quantization thresholds per value.

23. The system of claim 17 further comprising:
at least one rendering device.

24. The system of claim 23 wherein the at least one rendering device comprises:
at least one of an ink jet printer, an electro-photographic printer and a xerographic printer.

* * * * *